(12) United States Patent
Zhang

(10) Patent No.: US 12,332,161 B2
(45) Date of Patent: Jun. 17, 2025

(54) GAS SENSOR FOR MEASURING GAS CONCENTRATION

(71) Applicant: AAC ACOUSTIC TECHNOLOGIES (SHENZHEN) CO., LTD., Shenzhen (CN)

(72) Inventor: Jinyu Zhang, Shenzhen (CN)

(73) Assignee: AAC ACOUSTIC TECHNOLOGIES (SHENZHEN) CO., LTD., Shenzhen (CN)

( * ) Notice: Subject to any disclaimer, the term of this patent is extended or adjusted under 35 U.S.C. 154(b) by 281 days.

(21) Appl. No.: 18/095,003

(22) Filed: Jan. 10, 2023

(65) Prior Publication Data

US 2023/0349816 A1    Nov. 2, 2023

Related U.S. Application Data

(63) Continuation of application No. PCT/CN2022/093812, filed on May 19, 2022.

(30) Foreign Application Priority Data

Apr. 28, 2022    (CN) .......................... 202221018274.X

(51) Int. Cl.
*G01N 21/17* (2006.01)
*G01N 21/01* (2006.01)
*G01N 29/02* (2006.01)
*G01N 29/24* (2006.01)

(52) U.S. Cl.
CPC ......... *G01N 21/1702* (2013.01); *G01N 21/01* (2013.01); *G01N 29/02* (2013.01); *G01N 29/2418* (2013.01); *G01N 2021/1704* (2013.01)

(58) Field of Classification Search
CPC .... G01N 21/1702; G01N 21/00; G01N 21/01; G01N 29/02; G01N 29/14; G01N 29/2418; G01N 2021/1704; G01N 2021/1714; G01N 2291/02809
See application file for complete search history.

(56) References Cited

U.S. PATENT DOCUMENTS

| | | | |
|---|---|---|---|
| 2012/0055232 A1* | 3/2012 | Thorson | G01N 21/1702 73/24.02 |
| 2018/0160905 A1* | 6/2018 | Wang | A61B 5/7246 |

FOREIGN PATENT DOCUMENTS

CN    112730264 A  *  4/2021   ......... G01N 21/1702

* cited by examiner

*Primary Examiner* — Suman K Nath
(74) *Attorney, Agent, or Firm* — Wiersch Law Group

(57) ABSTRACT

The present disclosure provides a gas sensor, including a substrate, a first housing fixed on the substrate and enclosed with the substrate to form a first chamber, and a first infrared transmitter and a first acoustic sensor connected to the substrate. The first acoustic sensor and the first infrared transmitter are housed in the first chamber, and the first housing is provided with a first venthole. The gas sensor also includes an environmental detection assembly connected to the substrate and located outside the first housing, and a differential processor connected to the substrate. The differential processor of the present disclosure can eliminate the ambient sound signal and the vibration signal in the first detection signal according to the second detection signal. Eliminate the strong interference of noise and vibration in the external environment, and improve the accuracy of the gas concentration detection of the gas sensor.

9 Claims, 4 Drawing Sheets

GAS SENSOR FOR MEASURING GAS CONCENTRATION

FIELD OF THE PRESENT DISCLOSURE

The present disclosure relates to the technical field of sensors, and in particular relates to a gas sensor.

DESCRIPTION OF RELATED ART

A gas sensor is a converter that converts a certain gas volume fraction into a corresponding electric signal. Existing gas sensors usually include a housing, a damping net, a substrate, an infrared transmitter, and an acoustic sensor. the external gas passes through the damping net through diffusion and is balanced with the internal gas concentration. When the sensor is working, the infrared transmitter emits infrared light of a specific wavelength at a certain sound frequency (e.g., 30 Hz). This wavelength of the infrared light is strongly absorbed by the gas to be measured and converted into heat. An alternating pressure signal is generated in the internal chamber, which is received by the acoustic sensor and converted into an electric signal. The higher the concentration of the gas to be measured in the gas, the stronger the low frequency signal is. From the signal strength output by the microphone, the concentration of the gas to be measured can be calculated. The gas sensor in the related art is based on sound wave detection, it is easily interfered by the sound signal and vibration signal in the external environment, resulting in inaccurate detection results of the gas sensor.

Therefore, it is necessary to provide a gas sensor to solve the above problems.

SUMMARY OF THE PRESENT DISCLOSURE

The present disclosure is to provide a gas sensor, which can solve the technical problem that the gas sensor in the related art is susceptible to strong interference from sound signals and vibration signals in the external environment, resulting in inaccurate detection results.

For achieving the object mentioned above, the disclosure provides a gas sensor, including:

a substrate;

a first housing fixed on the substrate, having a first venthole;

a first chamber formed by the substrate and the first housing;

a first infrared transmitter and a first acoustic sensor accommodated in the first chamber and connected to the substrate, the first acoustic sensor being used for converting a pressure in the first chamber into a first detection signal which includes an ambient sound signal and a vibration signal;

an environmental detection assembly connected to the substrate and located outside the first housing for generating a second detection signal having an ambient sound signal and a vibration signal;

a differential processor connected with the substrate; wherein the differential processor is electrically connected to the first acoustic sensor and the environmental detection assembly for eliminating the ambient sound signal and the vibration signal in the first detection signal according to the second detection signal.

As an improvement of the above, the environmental detection assembly includes a second housing fixed on the substrate and enclosed with the substrate for forming a second chamber, a second infrared transmitter and a second acoustic sensor connected to the substrate; the second housing includes a second venthole; the differential processor is electrically connected to the second acoustic sensor; the first infrared transmitter and the second infrared transmitter emit infrared light with the same wavelength and a phase difference of 180°.

As an improvement of the above, the first housing and the second housing are integrally arranged to form a housing body, or the first housing and the second housing are arranged at intervals.

As an improvement of the above, an inner wall of the first chamber on the side close to the second chamber and an inner wall of the second chamber on the side close to the first chamber are coated with a sound insulation layer.

As an improvement of the above, an inner wall of the first chamber and an inner wall of the second chamber are both coated with a reflective film for reflecting infrared light.

As an improvement of the above, a structure of the first chamber is same to a structure of the second chamber; a size of the first venthole is same to a size of the second venthole; an arrangement of the first acoustic sensor and the first infrared transmitter in the first chamber is same to an arrangement of the second acoustic sensor and the second infrared transmitter in the second chamber.

As an improvement of the above, the first venthole is opened on a side of the first housing away from the substrate, and the first venthole and the first acoustic sensor are arranged opposite to each other; the second venthole is opened on a side of the second housing away from the substrate, and the second venthole and the second acoustic sensor are arranged opposite to each other.

As an improvement of the above, the first housing is fixed with a first damping net covering the first venthole, and the second housing is fixed with a second damping net covering the second venthole, and the second damping net is same to the first damping net.

As an improvement of the above, the environmental detection assembly further includes a second acoustic sensor connected to the substrate; the differential processor is electrically connected to the second acoustic sensor, and the second acoustic sensor is exposed to the environment.

As an improvement of the above, the first acoustic sensor and the second acoustic sensor are arranged in parallel on the substrate; the first acoustic sensor is same to the second acoustic sensor.

BRIEF DESCRIPTION OF THE DRAWINGS

Many aspects of the exemplary embodiments can be better understood with reference to the following drawings. The components in the drawing are not necessarily drawn to scale, the emphasis instead being placed upon clearly illustrating the principles of the present disclosure.

DETAILED DESCRIPTION OF THE EXEMPLARY EMBODIMENTS

The present disclosure will hereinafter be described in detail with reference to several exemplary embodiments. To make the technical problems to be solved, technical solutions and beneficial effects of the present disclosure more apparent, the present disclosure is described in further detail together with the figures and the embodiments. It should be understood the specific embodiments described hereby are only to explain the disclosure, not intended to limit the disclosure.

Figure 1:
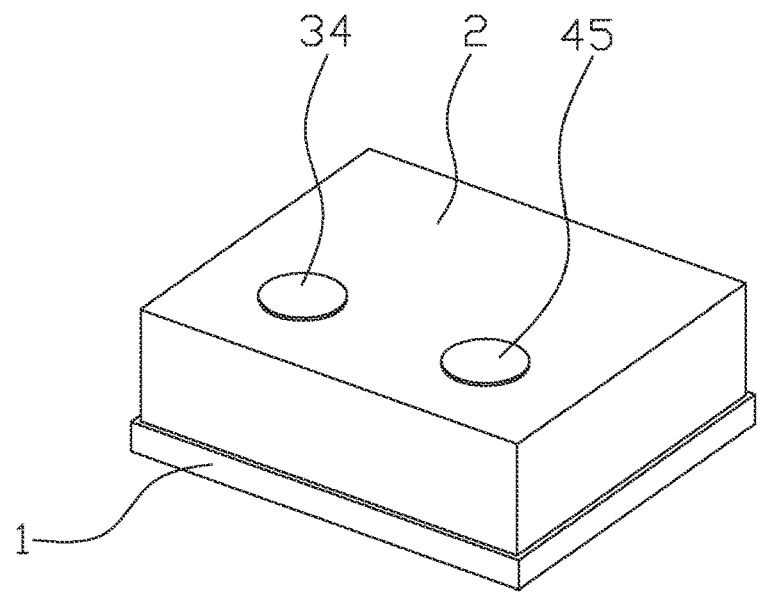
FIG. 1 is an isometric view of a gas sensor in accordance with a first embodiment of the present disclosure.
Figure 2:
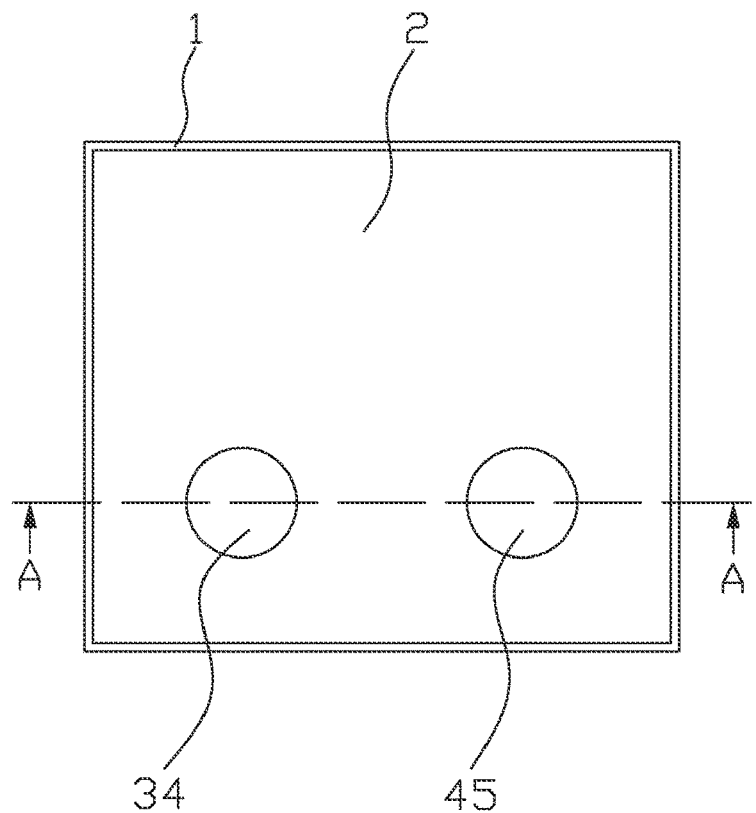
FIG. 2 is a top view of the gas sensor in the first embodiment.

Please refer to FIGS. 1-2, a gas sensor includes a substrate 1, a first housing 21 fixed on substrate 1 and enclosed with substrate 1 to form a first chamber 32, a first infrared transmitter 35 and a first acoustic sensor 31 are connected to the substrate 1. The first acoustic sensor 31 and the first infrared transmitter 35 are accommodated in the first chamber 32. first housing 21 is arranged with a first venthole 33, and the first acoustic sensor 31 is used to convert the pressure in the first chamber 32 into a first detection signal. The first detection signal includes an ambient sound signal and a vibration signal. The gas sensor also includes an environmental detection assembly 4 connected to the substrate 1 and located outside the first housing 21 and a differential processor connected to the substrate 1. The second detection signal generated by the environmental detection assembly 4 includes an ambient sound signal and a vibration signal. The differential processor is electrically connected to the first acoustic sensor 31 and the environmental detection assembly 4. The differential processor is used to eliminate the ambient sound signal and the vibration signal in the first detection signal according to the second detection signal. It should be understood that the word "connect" reflects a connection relationship, such as a direct mechanical connection, an indirect mechanical connection, or an electrical connection.

The gas sensor in this embodiment is a differential pas (photoacoustic spectroscopy) gas sensor. It can be understood that by setting the environmental detection assembly 4 on the substrate 1, the environmental detection assembly 4 can detect the sound and vibration in the environment and convert it into a second detection signal. The differential processor can eliminate the ambient sound signal and the vibration signal in the first detection signal according to the second detection signal. The strong interference of noise and vibration in the external environment can be eliminated so as to obtain accurate concentration data of the gas to be measured, and improve the accuracy of gas concentration detection by the gas sensor.

Figure 3:
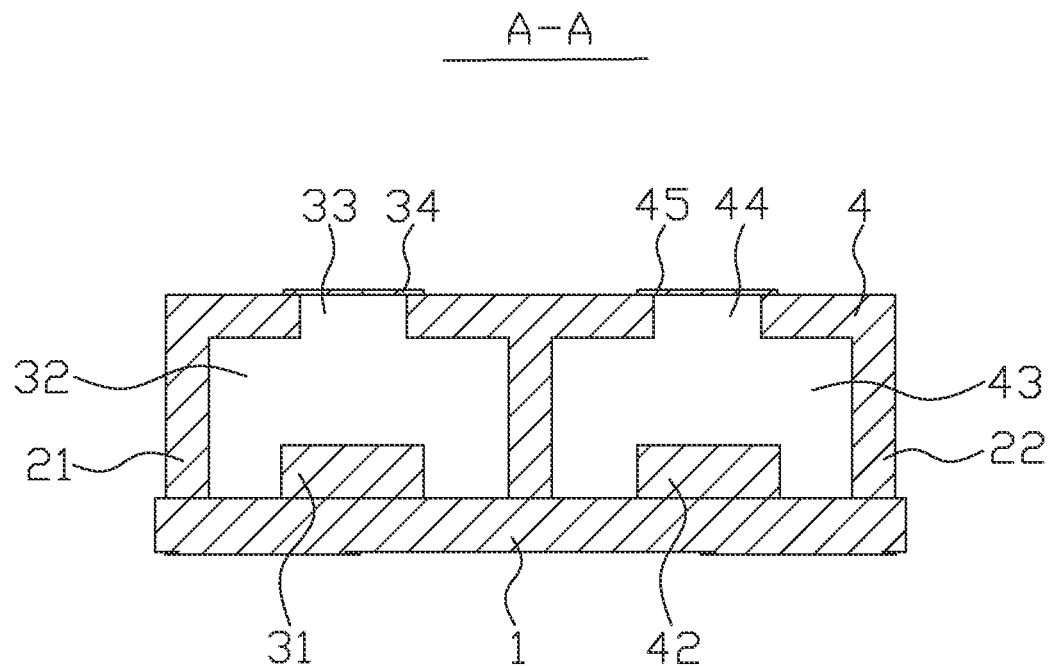
FIG. 3 is a cross-sectional view of the gas sensor taken along line A-A in FIG. 2.
Figure 4:
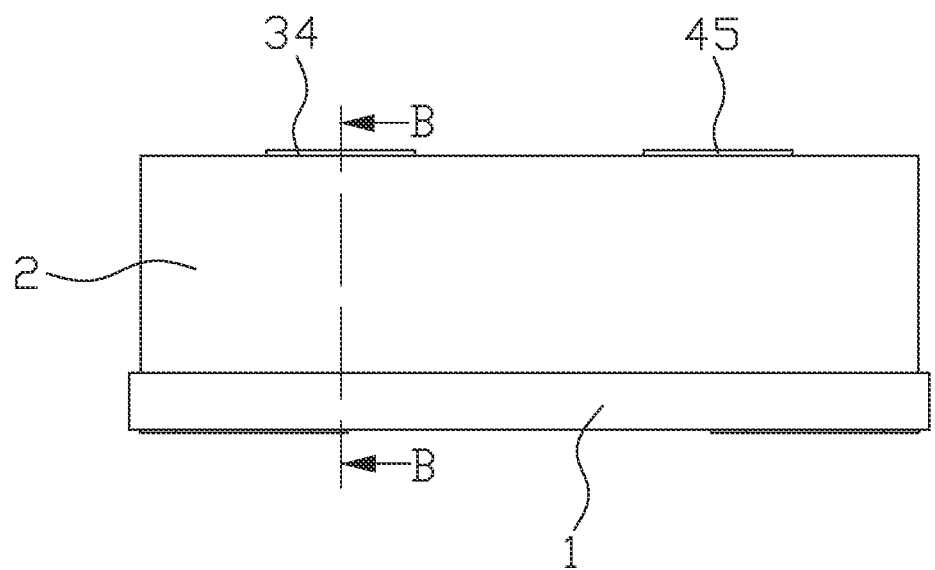
FIG. 4 is a left side view of the gas sensor in the first embodiment.
Figure 5:
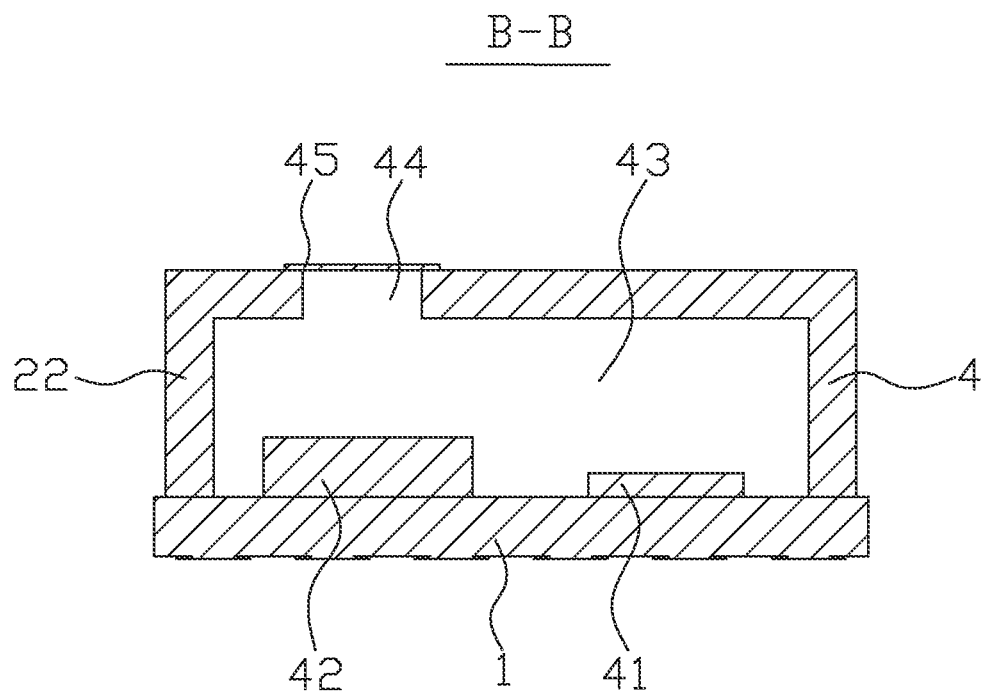
FIG. 5 is a cross-sectional view of the gas sensor taken along line B-B in FIG. 4.

Please refer to FIGS. 3 and 5. The environmental detection assembly 4 includes a second housing 22 fixed on substrate 1 and enclosed with substrate 1 to form second chamber 43, a second infrared transmitter 41 and a second acoustic sensor 42 are connected to the substrate 1. The second housing 22 opens the second venthole 44. The differential processor is electrically connected to the second acoustic sensor 42. The first infrared transmitter 35 and the second infrared transmitter 41 emit infrared light with the same wavelength and a phase difference of 180°. The first acoustic sensor 31 and the second acoustic sensor 42 are parallel to each other. The first acoustic sensor 31 and the second acoustic sensor 42 are the same acoustic sensor. Specifically, both the first housing 21 and the second housing 22 can be rectangular housings, and the corresponding first chamber 32 and the second chamber 43 are rectangular chambers. The first venthole 33 and the second venthole 44 may be rectangular holes. The differential processor may be a differential amplifier. The first acoustic sensor 31 and the second acoustic sensor 42 may be a microphone. The structure of the gas sensor is simple and the molding is convenient. The first infrared transmitter 35 and the second infrared transmitter 41 emit infrared light with the same wavelength and a phase difference of 180°. Thus, a wave with a phase difference of 180° is generated in the first chamber 32 and the second chamber 43. The first acoustic sensor 31 and the second acoustic sensor 42 are placed in parallel, and the first acoustic sensor 31 and the second acoustic sensor 42 are the same acoustic sensor, so that the first acoustic sensor 31 and the second acoustic sensor 42 have the same phase of vibration signals generated by external vibration interference. The gas to be measured enters the first chamber 32 from the first venthole 33, enters the second chamber 43 from the second venthole 44, and generates the same direction signal.

Understandably, the infrared transmitter emits infrared light of a specific wavelength at a certain frequency (e.g., 30 Hz), This wavelength of the infrared light is strongly absorbed by the gas to be measured and converted into heat. And an alternating pressure signal is generated in the chamber, thus it can be received by the acoustic sensor. The acoustic sensor converts the alternating pressure signal into an electric signal and transmits it to the differential processor. The differential processor processes the received second detection signal and the first detection signal so that in-phase ambient sound and vibration are eliminated. Thus, the defects of the gas sensor based on photoacoustic spectroscopy susceptible to external noise and vibration interference can be eliminated. Also, the higher the concentration of the gas to be measured in the gas, the stronger the low frequency signal is generated. According to the signal strength output by the acoustic sensor, the concentration of the gas to be measured can be calculated.

The first housing 21 and the second housing 22 are integrated to form the housing body 2. The first chamber 32 close to the second chamber 43 and the inner wall of the side of the second chamber 43 close to the first chamber 32 are both coated with a sound insulation layer. Specifically, the first housing 21 and the second housing 22 may be an integrated housing body 2. The housing body 2 is provided with a cavity, and the bottom of the cavity is fixed with a separation plate that can divide the cavity into the first chamber 32 and the second chamber 43 which are disconnected. The partition plate corresponding to the first chamber 32 and the second chamber 43 are coated with a sound insulation layer. It avoids the sound generated by one of the first chamber 32 and the second chamber 43 from passing through the partition plate to interfere with the other chamber, further improving the accuracy of gas concentration measurement. In other embodiment, the first housing 21 and the second housing 22 are arranged at intervals. Using the gap between the first housing 21 and the second housing 22, the sound generated between the first chamber 32 and the second chamber 43 is prevented from interfering with each other.

Preferably, both the inner wall of the first chamber 32 and the inner wall of the second chamber 43 are coated with the reflective film. The infrared light emitted by the first infrared transmitter 35 and the second infrared transmitter 41 is transmitted to the reflective film and reflected by the reflective film. By using the reflective film, the infrared light emitted by the infrared transmitter can be reflected multiple times in the chamber, so that the infrared light and the gas to be measured are in full contact, which is beneficial for the gas to be measured to absorb the infrared light. The structure of the first chamber 32 is the same as that of the second chamber 43, and the size of the first venthole 33 is the same as that of the second venthole 44. It can ensure that the speed of gas to be measured flowing into the chamber is comparatively consistent and the concentration of gas to be measured is the same, which improves the measurement accuracy of the gas sensor.

The first venthole 33 is opened on the side of the first housing 21 away from the substrate 1, and the first venthole 33 and the first acoustic sensor 31 are set opposite to each other. The second venthole 44 is opened on the side of the second housing 22 away from the substrate 1, and the second venthole 44 and the second acoustic sensor 42 are arranged opposite to each other. Specifically, the second acoustic sensor 42 is provided on one side of the second chamber 43, and the second infrared transmitter 41 is provided on the other side of the second chamber 43. The infrared light emitted by the second infrared transmitter 41 is not easily irradiated to the outside of the second chamber 43 through the second venthole 44, which can also ensure that after the second chamber 43 is partly filled with the gas to be measured, the gas to be measured reabsorbs the infrared light emitted by the second infrared transmitter 41, which is beneficial to ensure the detection capability of the gas sensor.

The first housing 21 is fixed with a first damping net 34 covering the first venthole 33. The second housing 22 is fixed with a second damping net 45 covering the second venthole 44, and the first damping net 34 and the second damping net 45 are the same damping net. Specifically, both the first damping net 34 and the second damping net 45 may be water-blocking and breathable filter membranes. Other debris (such as water and solid particles) can be prevented from entering the chamber, ensuring that only gas to be measured enters, thereby interfering with the detection effect of the gas sensor. The first damping net 34 and the second damping net 45 are the same damping net, which ensures that the gas to be measured in the first chamber 32 and the second chamber 43 is consistent. Reduces possible differences between the first damping net 34 and the second damping net 45 to maintain consistency in differential measurements.

Figure 6:
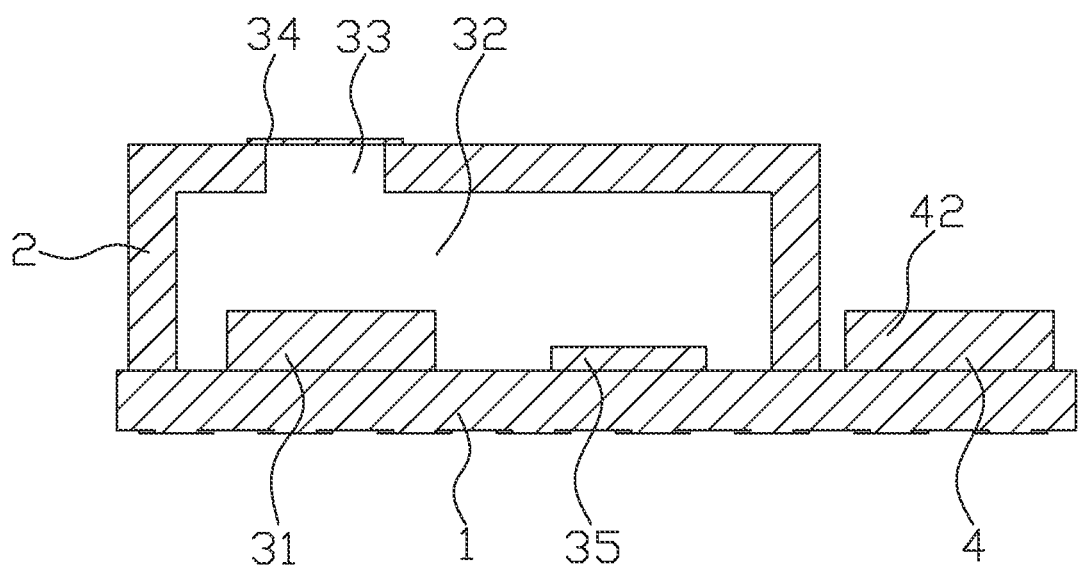
FIG. 6 is a cross-sectional view of a gas sensor in accordance with a second embodiment of the present disclosure.
Figure 7:
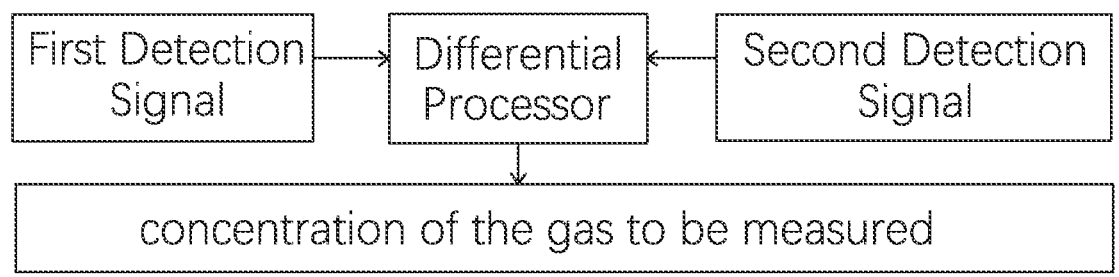
FIG. 7 is a signal flow chart of the gas sensor.

Referring to FIG. 6, in the second embodiment of this embodiment, the environmental detection assembly 4 further includes a second acoustic sensor 42 connected to the substrate 1. The differential processor is electrically connected to the second acoustic sensor 42, which is exposed to the environment. Specifically, both the first acoustic sensor 31 and the second acoustic sensor 42 can be a microphone. The first acoustic sensor 31 and the second acoustic sensor 42 are parallel to each other. The first acoustic sensor 31 and the second acoustic sensor 42 are the same acoustic sensor. The first detection signal transmitted by the first acoustic sensor 31 to the differential processor includes an ambient sound signal, a vibration signal and a concentration signal of the gas to be measured. The second detection signal transmitted by the second acoustic sensor 42 to the differential processor includes an ambient sound signal and a vibration signal. The differential processor processes the first detection signal and the second detection signal, so that the ambient sound signal and vibration signal are eliminated, and the interference of noise and vibration in the external environment is eliminated, so that the gas sensor can measure the accurate concentration of the gas to be measured.

It should be understood that, compared with the arrangement of two chambers in the first embodiment, the size and cost of the second embodiment are lower. At the same time, the second acoustic sensor 42 of the second embodiment can also be used as an ordinary microphone to provide the required sound signal of the gas sensor. The first detection signal and the second detection signal in the first embodiment include an ambient sound signal, a vibration signal, and a concentration signal of the gas to be measured. The infrared light emitted by the two infrared transmitters has the same wavelength, and the phase difference is 180°. The calculation by the differential processor outputs a signal whose intensity is doubled, so that the concentration of the gas to be measured obtained through the first embodiment is double the actual concentration of the gas to be measured. The first detection signal in the second embodiment includes an ambient sound signal, a vibration signal, and a concentration signal of the gas to be measured. The second detection signal only includes the ambient sound signal and the vibration signal, so that the concentration of the gas to be measured obtained through the second embodiment is the same as the actual concentration of the gas to be measured.

It is to be understood, however, that even though numerous characteristics and advantages of the present exemplary embodiments have been set forth in the foregoing description, together with details of the structures and functions of the embodiments, the disclosure is illustrative only, and changes may be made in detail, especially in matters of shape, size, and arrangement of parts within the principles of the disclosure to the full extent indicated by the broad general meaning of the terms where the appended claims are expressed.

What is claimed is:

1. A gas sensor for measuring gas concentration, including:
    a substrate;
    a first housing fixed on the substrate, having a first venthole;
    a first chamber formed by the substrate and the first housing;
    a first infrared transmitter and a first acoustic sensor accommodated in the first chamber and connected to the substrate, the first acoustic sensor being used for converting a pressure in the first chamber into a first detection signal which includes an ambient sound signal and a vibration signal;
    an environmental detection assembly connected to the substrate and located outside the first housing for generating a second detection signal having a second ambient sound signal and a second vibration signal;
    a differential processor being connected with the substrate; wherein
    the differential processor is electrically connected to the first acoustic sensor and the environmental detection assembly for eliminating the ambient sound signal and the vibration signal from the first detection signal according to the second detection signal;
    wherein the environmental detection assembly includes a second housing fixed on the substrate and enclosed with the substrate for forming a second chamber, a second infrared transmitter and a second acoustic sensor connected to the substrate; the second housing includes a second venthole; the differential processor is electrically connected to the second acoustic sensor; the first infrared transmitter and the second infrared transmitter emit infrared light with the same wavelength and a phase difference of 180°.

2. The gas sensor for measuring gas concentration as described in claim 1, wherein the first housing and the second housing are integrally arranged to form a housing body, or the first housing and the second housing are arranged at intervals.

3. The gas sensor for measuring gas concentration as described in claim 2, wherein an inner wall of the first chamber on the side close to the second chamber and an inner wall of the second chamber on the side close to the first chamber are both coated with a sound insulation layer.

4. The gas sensor for measuring gas concentration as described in claim 1, wherein an inner wall of the first chamber and an inner wall of the second chamber are both coated with a reflective film for reflecting infrared light.

5. The gas sensor for measuring gas concentration as described in claim 1, wherein a structure of the first chamber is substantially same to a structure of the second chamber; a size of the first venthole is substantially same to a size of the second venthole; an arrangement of the first acoustic sensor and the first infrared transmitter in the first chamber is substantially same to an arrangement of the second acoustic sensor and the second infrared transmitter in the second chamber.

6. The gas sensor for measuring gas concentration as described in claim 5, wherein the first venthole is opened on a side of the first housing away from the substrate, and the first venthole and the first acoustic sensor are arranged opposite to each other; the second venthole is opened on a side of the second housing away from the substrate, and the second venthole and the second acoustic sensor are arranged opposite to each other.

7. The gas sensor for measuring gas concentration as described in claim 1, wherein the first housing is fixed with a first damping net covering the first venthole, and the second housing is fixed with a second damping net covering the second venthole; and the second damping net is same to the first damping net.

8. The gas sensor for measuring gas concentration as described in claim 1, wherein the environmental detection assembly further includes a second acoustic sensor connected to the substrate; the differential processor is electrically connected to the second acoustic sensor, and the second acoustic sensor is exposed to the environment.

9. The gas sensor for measuring gas concentration as described in claim 1, wherein the first acoustic sensor and the second acoustic sensor are arranged in parallel on the substrate; the first acoustic sensor is same to the second acoustic sensor.

* * * * *